(12) United States Patent
Fujita et al.

(10) Patent No.: US 10,566,912 B2
(45) Date of Patent: Feb. 18, 2020

(54) VIBRATION-DRIVEN ENERGY HARVESTER

(71) Applicants: THE UNIVERSITY OF TOKYO, Tokyo (JP); KABUSHIKI KAISHA SAGINOMIYA SEISAKUSHO, Tokyo (JP)

(72) Inventors: Hiroyuki Fujita, Tokyo (JP); Hiroyuki Mitsuya, Sayama (JP)

(73) Assignees: The University of Tokyo, Tokyo (JP); Saginomiya Seisakusho, Inc., Tokyo (JP)

( * ) Notice: Subject to any disclaimer, the term of this patent is extended or adjusted under 35 U.S.C. 154(b) by 0 days.

(21) Appl. No.: 15/121,128

(22) PCT Filed: Feb. 9, 2015

(86) PCT No.: PCT/JP2015/053523
§ 371 (c)(1),
(2) Date: Aug. 24, 2016

(87) PCT Pub. No.: WO2015/129442
PCT Pub. Date: Sep. 3, 2015

(65) Prior Publication Data
US 2017/0019034 A1  Jan. 19, 2017

(30) Foreign Application Priority Data
Feb. 27, 2014  (JP) .................... 2014-036507

(51) Int. Cl.
*H02N 1/08* (2006.01)
*F03G 7/08* (2006.01)

(52) U.S. Cl.
CPC ................ *H02N 1/08* (2013.01); *F03G 7/08* (2013.01)

(58) Field of Classification Search
CPC .................................................. H02N 1/00–12
(Continued)

(56) References Cited

U.S. PATENT DOCUMENTS

| 7,898,096 B1* | 3/2011 | Krupenkin | H02N 1/08 290/1 R |
| 2006/0077762 A1* | 4/2006 | Boland | H02N 1/08 367/170 |

(Continued)

FOREIGN PATENT DOCUMENTS

| CN | 101187730 A | 5/2008 |
| JP | 2011-36089 A | 2/2011 |
| JP | 2011-507479 A | 3/2011 |

OTHER PUBLICATIONS

International Search Report (PCT/ISA/210) issued in PCT Application No. PCT/JP2015/053523 dated May 12, 2015 with English translation (four pages).

(Continued)

*Primary Examiner* — Thomas Truong
(74) *Attorney, Agent, or Firm* — Crowell & Moring LLP

(57) ABSTRACT

A vibration-driven energy harvester includes: a fixed electrode; a movable electrode that is disposed so as to face opposite the fixed electrode and is allowed to move relative to the fixed electrode; and an ionic liquid disposed between the fixed electrode and the movable electrode which face opposite each other, wherein: power is generated as an external vibration moves the movable electrode, causing a change in at least one of an area of an electrical double layer formed on two sides of an interface of the fixed electrode and the ionic liquid and an area of an electrical double layer formed on two sides of an interface of the movable electrode and the ionic liquid.

4 Claims, 14 Drawing Sheets

(58) Field of Classification Search
USPC .................................................. 310/300, 309
See application file for complete search history.

(56) References Cited

U.S. PATENT DOCUMENTS

| | | | |
|---|---|---|---|
| 2008/0080035 A1 | 4/2008 | Sugahara | |
| 2010/0295415 A1* | 11/2010 | Despesse ................ | H02N 1/08 310/300 |
| 2013/0280579 A1* | 10/2013 | Wright ................... | H01B 1/122 429/124 |
| 2015/0061459 A1* | 3/2015 | Kwon ...................... | H02N 1/08 310/309 |

OTHER PUBLICATIONS

Japanese-language Written Opinion (PCT/ISA/237) issued in PCT Application No. PCT/JP2015/053523 dated May 12, 2015 (three pages).

* cited by examiner

FIG.1
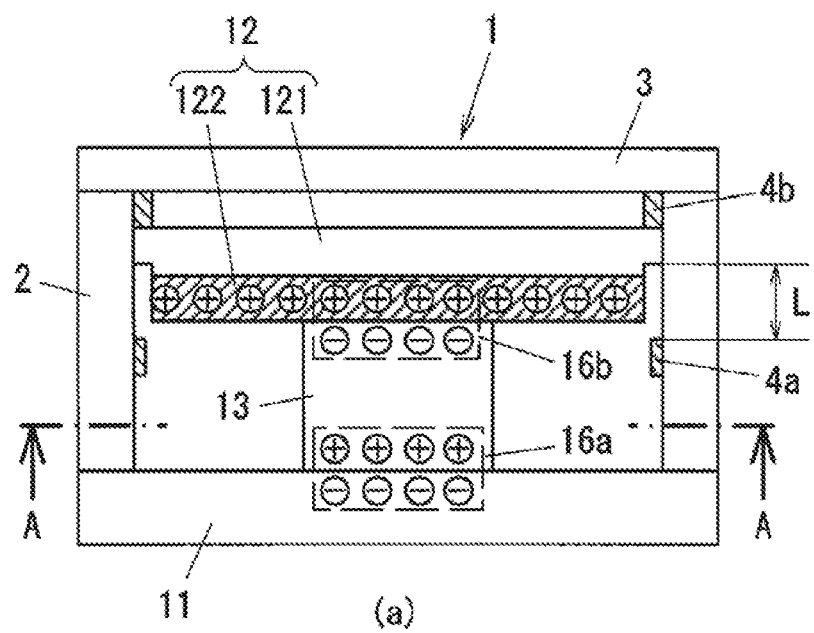
(a)
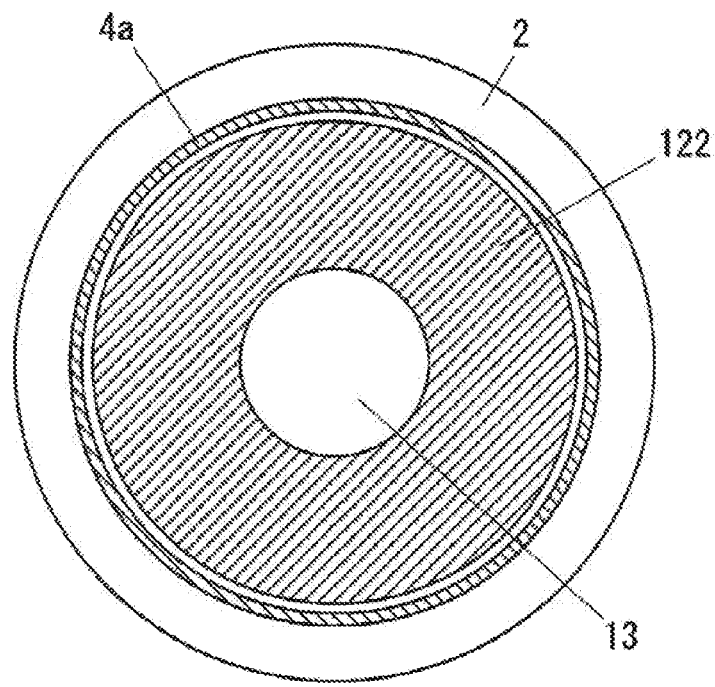
(b)

FIG.8
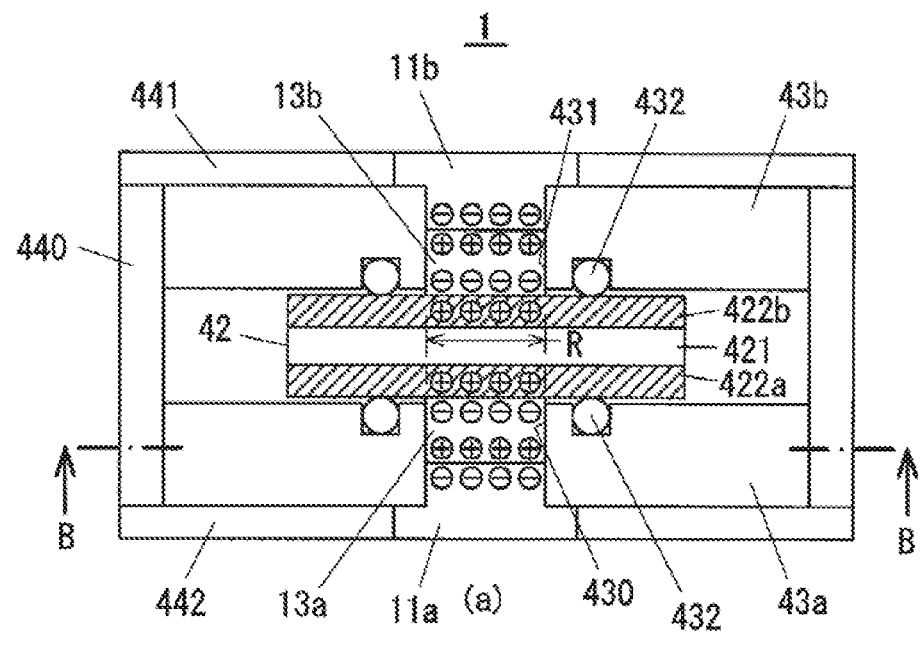
(a)
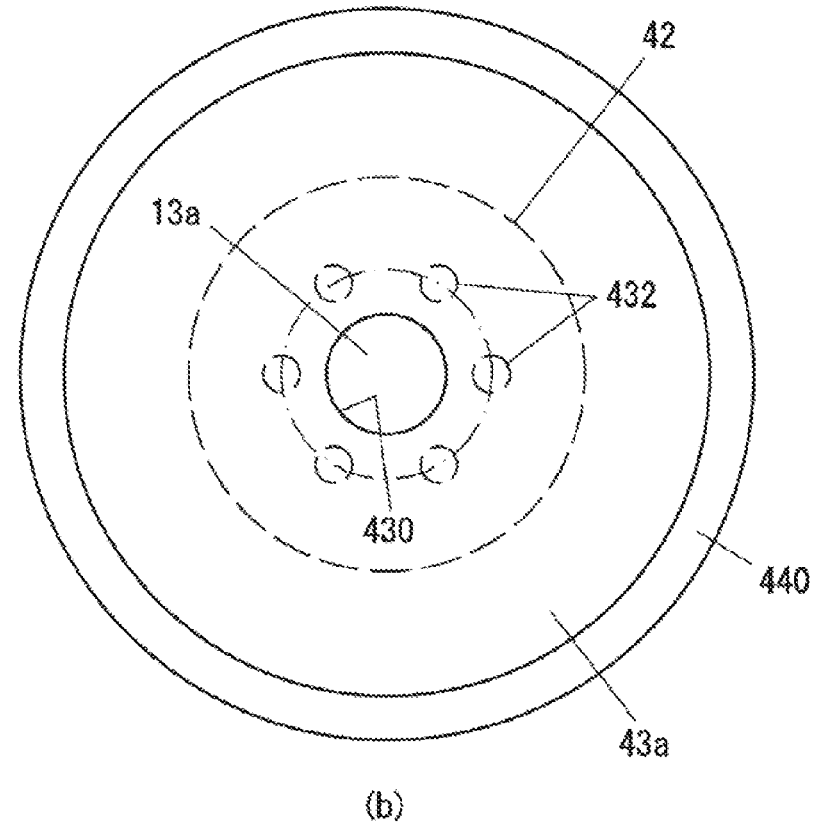
(b)

FIG.9
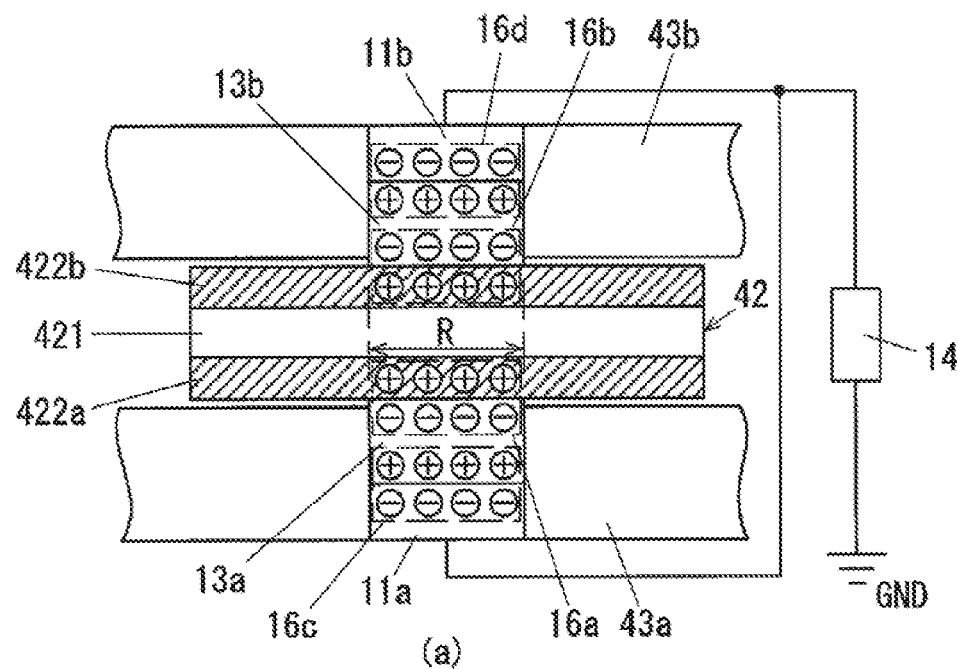
(a)
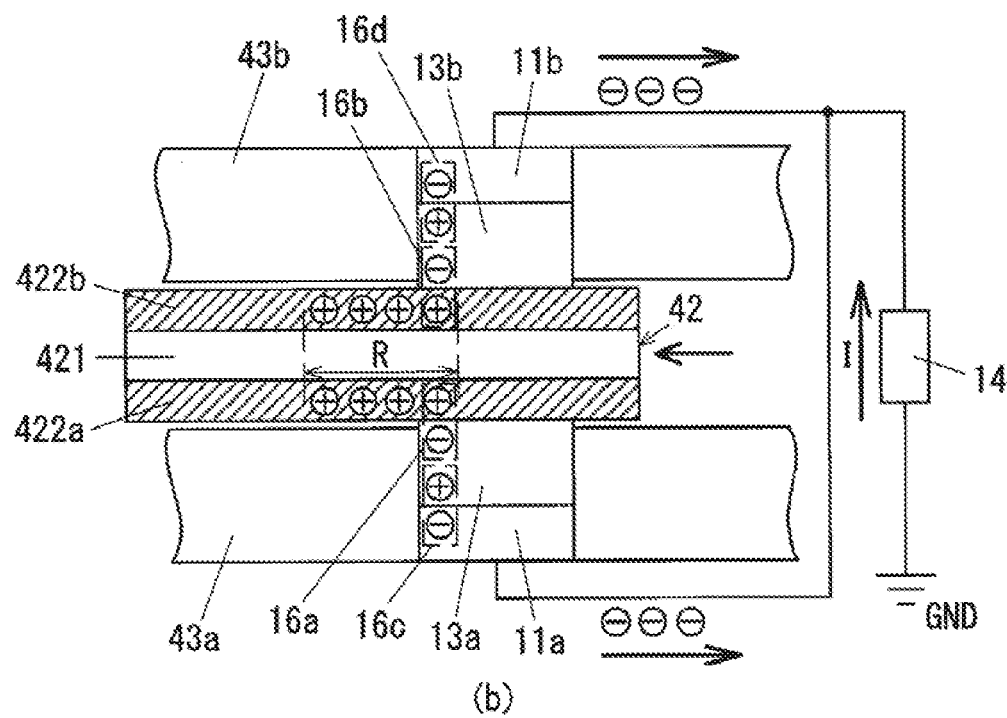
(b)

FIG.13
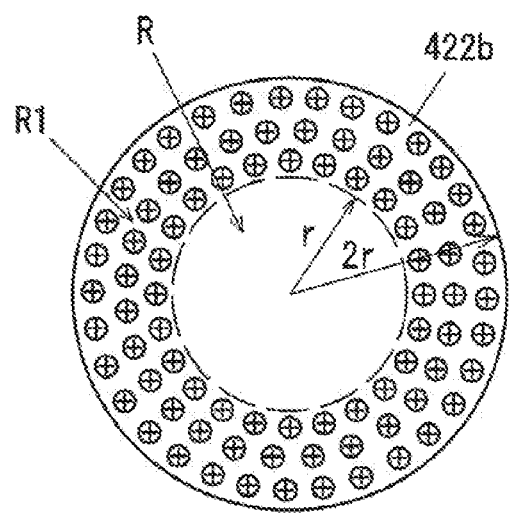
(a)
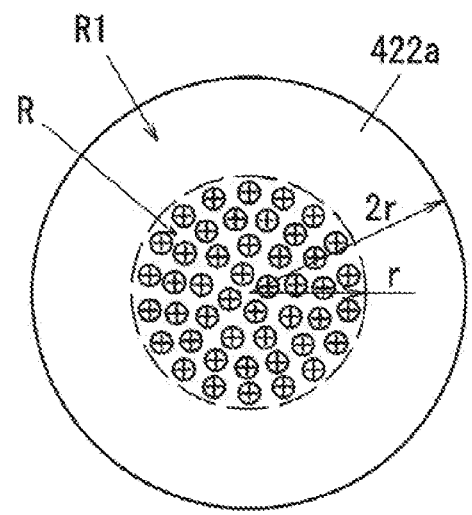
(b)

VIBRATION-DRIVEN ENERGY HARVESTER

TECHNICAL FIELD

The present invention relates to a vibration-driven energy harvester achieved by using an ionic liquid.

Much effort has been focused on research and development of devices that generate electric power from ambient vibration (energy harvesters), the effectiveness of which is improved through the use of electrets. Vibration-driven power generating devices, primarily used as power sources for various types of wireless standalone sensors and as power sources for wireless communication devices for signals output by such wireless sensors, need to be compact and, at the same time, capable of generating significant amounts of power (in a μW—through mW range). A vibration-driven energy harvester disclosed in PTL1, for instance, generates power by vibrating a vibrating electrode relative to an electrode on which an electret is formed.

CITATION LIST

Patent Literature

PTL1: Japanese laid open patent publication No. 2011-36089

SUMMARY OF INVENTION

Technical Problem

There is a challenging issue to be addressed in order to achieve both a smaller device size and a greater power generation output in the vibration-driven energy harvester described above, in that the electrodes are separated from each other by a distance in a μm-order, and the amount of power it can generate will be limited even in conjunction with an electret.

Solution to Problem

A vibration-driven energy harvester according to a first aspect of the present invention comprises: a fixed electrode; a movable electrode that is disposed so as to face opposite the fixed electrode and is allowed to move relative to the fixed electrode; and an ionic liquid disposed between the fixed electrode and the movable electrode which face opposite each other, wherein: power is generated as an external vibration moves the movable electrode, causing a change in at least one of an area of an electrical double layer formed on two sides of an interface of the fixed electrode and the ionic liquid and an area of an electrical double layer formed on two sides of an interface of the movable electrode and the ionic liquid.

According to a second aspect of the present invention, in the vibration-driven energy harvester according to the first aspect, it is preferable that the movable electrode is allowed to move along a direction in which a distance to the fixed electrode changes; and as the external vibration moves the movable electrode, the area of the electrical double layer formed on the two sides of the interface of the fixed electrode and the ionic liquid and the area of the electrical double layer formed on the two sides of the interface of the movable electrode and the ionic liquid each change.

According to a third aspect of the present invention, in the vibration-driven energy harvester according to the second aspect, it is preferable that one of the fixed electrode and the movable electrode facing opposite each other is an electret electrode; and a surface potential at the electret electrode is set within a potential window of the ionic liquid.

According to a fourth aspect of the present invention, in the vibration-driven energy harvester according to the second aspect, it is preferable that the electrical double layers are formed through an electro-kinetic phenomenon occurring over a contact region where the fixed electrode and the ionic liquid are in contact with each other and over a contact region where the movable electrode and the ionic liquid are in contact with each other.

According to a fifth aspect of the present invention, in the vibration-driven energy harvester according to any one of the second to the fourth aspects, it is preferable that the movable electrode includes a front-side electrode disposed on a front surface side of the movable electrode and a back-side electrode disposed on a back surface side of the movable electrode; the fixed electrode includes a first electrode disposed so as to face opposite the front-side electrode and a second electrode disposed so as to face opposite the back-side electrode; and the ionic liquid is disposed between the first electrode and the front-side electrode and between the second electrode and the back-side electrode.

According to a sixth aspect of the present invention, in the vibration-driven energy harvester according to the first aspect, it is preferable that the movable electrode is allowed to slide while sustaining a constant distance to the fixed electrode; and as the external vibration causes sliding movement of the movable electrode, the area of the electrical double layer formed on the two sides of the interface of the movable electrode and the ionic liquid changes.

According to a seventh aspect of the present invention, in the vibration-driven energy harvester according to the sixth aspect, it is preferable that the movable electrode includes; a movable substrate; and an electret electrode disposed at a surface of the movable substrate that faces opposite the fixed electrode, with a surface potential thereof set within a potential window of the ionic liquid; and as the movable electrode slides, an area of an electrical double layer formed on two sides of an interface of the electret electrode and the ionic liquid changes.

According to an eighth aspect of the present invention, in the vibration-driven energy harvester according to the seventh aspect, it is preferable that the movable electrode includes a first electret electrode disposed at a front surface of the movable substrate and a second electret electrode disposed at a back surface of the movable substrate; the fixed electrode includes a first electrode disposed so as to face opposite the front surface of the movable substrate and a second electrode disposed so as to face opposite the back surface of the movable substrate; and the ionic liquid is disposed between the first electrode and the front surface of the movable substrate and between the second electrode and the back surface of the movable substrate.

Advantageous Effects of Invention

According to the present invention, a compact vibration-driven energy harvester, capable of generating more power, can be provided.

BRIEF DESCRIPTION OF DRAWINGS

FIG. 1 Sectional views of a vibration-driven energy harvester achieved in a first embodiment of the present invention FIG. 2 A schematic illustration of an essential part of the vibration-driven energy harvester in FIG. 1

DESCRIPTION OF EMBODIMENTS

First Embodiment

Figure 2:
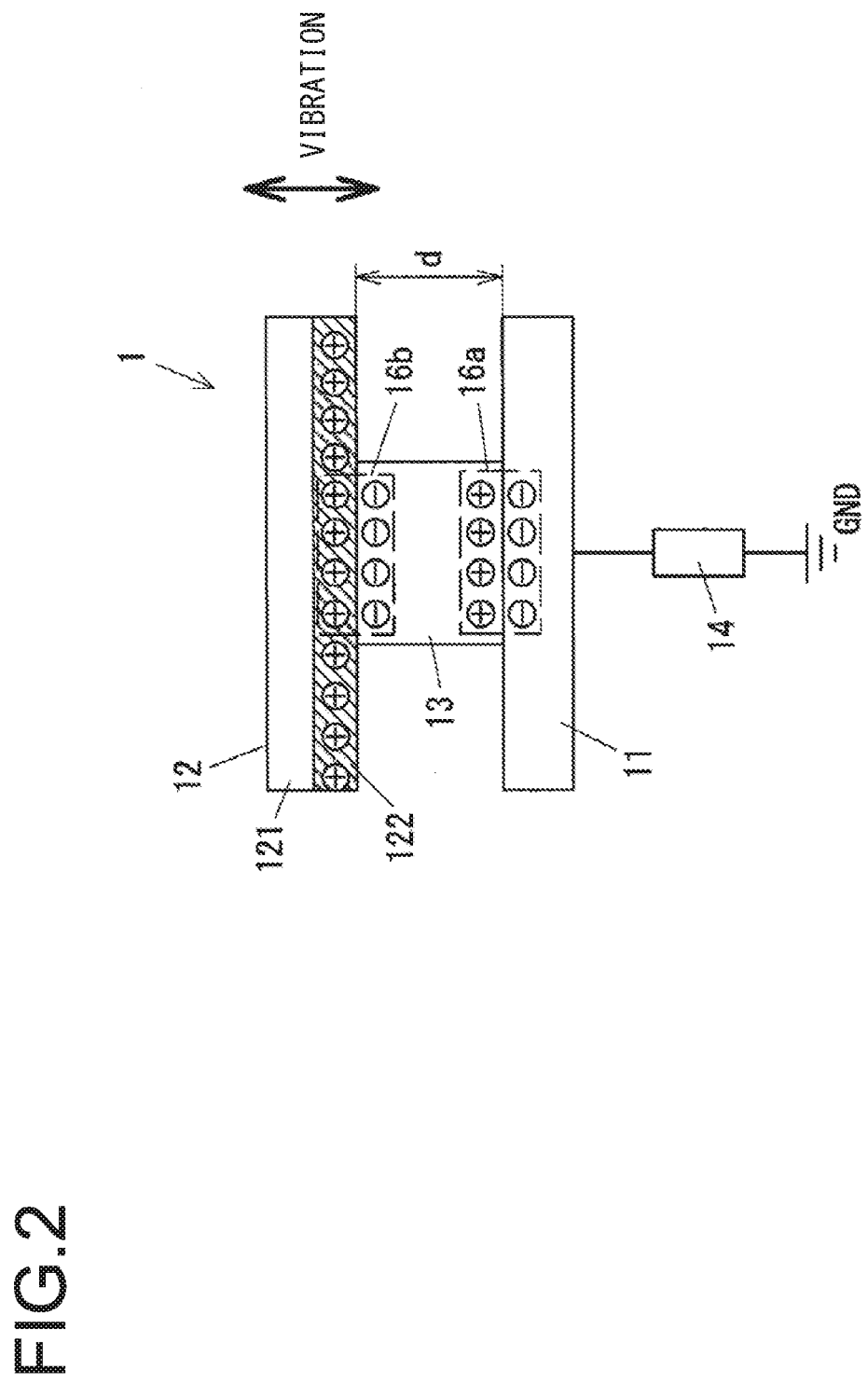

FIG. 1 illustrates the first embodiment of a vibration-driven energy harvester according to the present invention. FIG. 1(a) shows a vibration-driven energy harvester 1 in a sectional view, whereas FIG. 1(b) provides a sectional view taken along A-A in FIG. 1(a). The vibration-driven energy harvester 1 includes a fixed electrode 11, a movable substrate 12 and an ionic liquid 13. The ionic liquid 13 is disposed in the space between the fixed electrode 11 and the movable substrate 12. The fixed electrode 11 also functions as a bottom plate of a container formed at the vibration-driven energy harvester 1. The container is made up with the fixed electrode 11, and a cylindrical portion 2 and a top plate 3, both constituted of an insulating material.

The movable substrate 12 and the ionic liquid 13 mentioned above are housed inside the container. The movable substrate 12 is disposed so that it is allowed to move along the up/down direction in FIG. 1(a), and a range L over which it is allowed to move along the up/down direction is defined by ring-shaped stoppers 4a and 4b. The presence of any gas inside the container would hinder movement of the movable substrate 12, and for this reason, it is desirable that a state of vacuum be sustained inside the container. The movable substrate 12, assuming a disk shape, includes a support substrate 121 and an electret 122 disposed at the lower surface (the surface facing the fixed electrode 11) of the support substrate 121.

The electret 122 is formed by charging a dielectric film, such as a polypropylene (PP) film or a polytetrafluoroethylene (PTFE) film, positive (or negative) through, for instance, a corona discharge. Namely, the movable substrate 12 with the electret 122 formed thereat functions as a movable electrode.

It is desirable that the surface of the fixed electrode 11 that comes in contact with the ionic liquid 13 assures good water repellency, and for this reason, the fixed electrode 11 may be constituted of, for instance, gold (Au). In addition, it is desirable that a material (e.g., PTFE) having a low coefficient of friction be used to form the sliding surfaces, i.e., the inner surface of the cylindrical portion and the external circumferential surface of the support substrate 121, which slide against each other as the movable substrate 12 moves up/down.

The ionic liquid 13 present between the movable substrate 12 and the fixed electrode 11 is in contact with the electret 122 and the fixed electrode 11. In the embodiment, the electret 122 is charged positive and thus, negative ions in the ionic liquid 13 move toward the electret, whereas the positive ions in the ionic liquid 13 move toward the fixed electrode 11. As a result, an electrical double layer 16b is formed on the two sides of the interface of the electret 122 and the ionic liquid 13 and an electrical double layer 16a is formed on the two sides of the interface of the fixed electrode 11 and the ionic liquid 13. While the ionic liquid 13 may assume any of various compositions, the ionic liquid 13 in the embodiment is, for instance, 1-Ethyl-3-methylimidazolium tetrafluoroborate.

FIG. 2 schematically illustrates an essential part of the vibration-driven energy harvester 1. A load 14 is connected to the fixed electrode 11. The potential at the movable substrate 12 assumes a level higher than that at the fixed electrode 11 by an extent corresponding to the electret voltage (the surface potential at the electret 122). The ionic liquid 13 is a type of organic liquid constituted only with positive ions and negative ions, and evaporation is insignificant at normal temperatures, since its vapor pressure is extremely low at normal temperatures. In addition, its viscosity is approximately 30 to 500 [Pa·s]. While the ionic liquid 13, constituted of ions only, assures good conductivity, it assumes a wide potential window and thus assures a high level of electrical stability as well. The term "potential window" refers to a potential range in which no substantial current flows in the electrolyte, and the ionic liquid 13 has a potential window of approximately ±1 to 3 [V].

The voltage (surface potential) at the electret 122 mentioned above is set within the range defined in correspondence to the potential window of the ionic liquid 13. It is to be noted that from the viewpoint of maximizing the power generation capability of the vibration-driven energy harvester, the voltage at the electret 122 should be set as high as possible within the range of the potential window. In the following description, the voltage applied to the ionic liquid 13 via the electret 122 will be referred to as a bias voltage.

The negative ions in the ionic liquid 13 present between the electret 122 and the fixed electrode 11 are attracted to the electret 122 via the electric field formed by the electret 122. As a result, the electrical double layer 16b is formed on the two sides of the interface of the electret 122 and the ionic liquid 13, as described earlier. In addition, the positive ions in the ionic liquid 13 move towards the fixed electrode 11 in the region where the fixed electrode 11 and the ionic liquid 13 are in contact with each other, and these positive ions and a negative charge electrostatically induced toward the fixed electrode 11 together form the electrical double layer 16a. The thicknesses of the electrical double layers, determined by the type of ionic liquid 13, are normally approximately 1 [nm]. In addition, it is known that the electrostatic capacitance occurring as an AC voltage is applied to an electrical double layer is normally approximately 10 [μF/cm$^2$] to 0.2 [μF/cm$^2$] over a test range of 0.1 Hz to 1 MHz.

Figure 3:
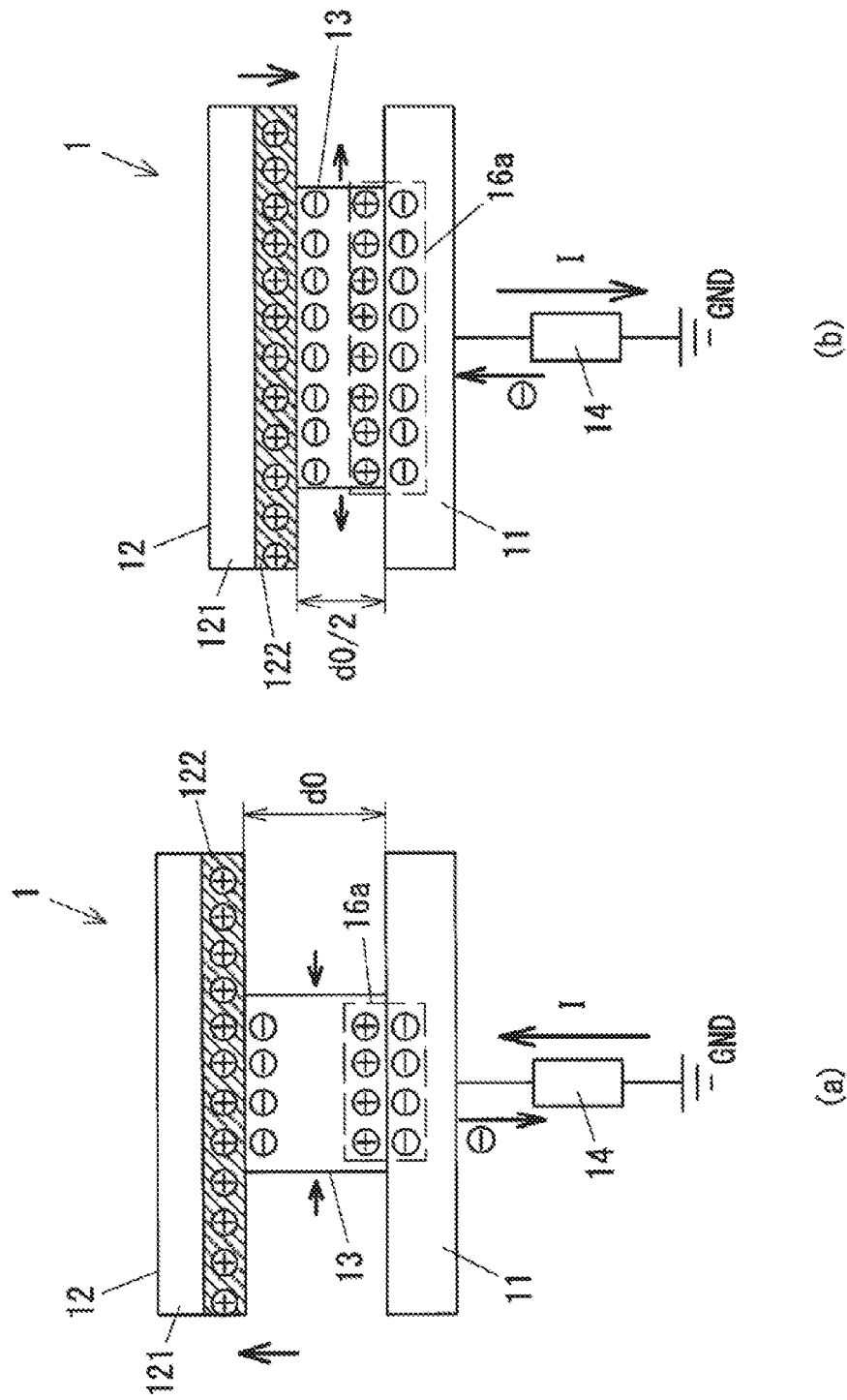
FIG. 3 Illustrations of the power generating operations executed in the first embodiment FIG. 4 A schematic illustration of the structure adopted in the vibration-driven energy harvester achieved in a second embodiment FIG. 5 A schematic illustration of an essential part of the vibration-driven energy harvester in FIG. 4

As FIG. 1 shows, the movable substrate 12 in the vibration-driven energy harvester 1 is structured so that it is allowed to move in a direction along which a distance d between the fixed electrode 11 and the movable substrate 12 is altered. As an external vibration (hereafter referred to as a disturbance) causes the container in the vibration-driven energy harvester 1 to vibrate (more specifically, vibrate along the axial direction), the movable substrate 12 vibrates relative to the fixed electrode 11 in the up/down direction in the figure. The movable substrate 12 may move up/down over the range in which the distance d changes between d0 and d0/2 as illustrated in FIG. 3, in reference to which an explanation will be provided later. This range of movement may be set in correspondence to the positions taken for the stoppers 4a and 4b shown in FIG. 1.

Next, the operation of the vibration-driven energy harvester 1 will be described. While a vibration-driven energy harvester in the related art generates power through a change in the electrostatic capacitance between electrodes (e.g., between a metal electrode and an electret electrode), the vibration-driven energy harvester 1 in the embodiment is characterized in that it generates power through a change in the contact area where contact with the ionic liquid 13 occurs (i.e., a change in the electrical double layer areas), caused by vibration of the movable substrate 12.

While the electrostatic capacitance per unit area of an electrical double layer changes in correspondence to the bias voltage mentioned earlier or the vibration frequency, the electrostatic capacitance per 1 cm$^2$ is approximately 10 [μF/cm$^2$] when the vibration frequency is 0.1 Hz provided that the bias voltage applied to the ionic liquid 13 is within the potential window range. Namely, if the electrical double layers 16a and 16b each have an area of 1 [cm$^2$], the electrostatic capacitances generated where the electrical double layers 16a and 16b are present will be approximately 10 [μF]=1×10$^{-5}$ [F]. Assuming that the voltages at the electrical double layers 16a and 16b are 1 [V], the quantity of charge (charge amount) is 1×10$^{-5}$ [C].

In a vibration-driven energy harvester with an electret electrode in the related art, the electrostatic capacitance C generated between the electret electrode and the metal electrode (C=$\varepsilon_0$×(area)/(distance)) is calculated to be 8.85× 10$^{-12}$ [F] to 8.85×10$^{-11}$ [F] assuming that the electret electrode and the metal electrode face opposite each other over a 1 [cm$^2$] area and are set apart from each other by approximately 10 to 100 [μm]. In this case, if the voltage at the electret electrode is 200 [V], the charge amount will be 1.77×10$^{-9}$ to 1.77×10$^{-10}$ [C], provided that the vacuum dielectric constant $\varepsilon_0$ is approximately equal to 8.85×10$^{-12}$ [F/m].

In the embodiment described above, the charge at the electrode is greatly increased to a level 10,000 to 100,000 times that achieved at the vibration-driven energy harvester with an electret in the related art, while the voltage applied to the electrical double layers is kept down as low as 1 [V]. This is made possible by the use of electrical double layers with a layer thickness (hereafter indicated as "de") in an order of nanometers. The structure achieved in the embodiment, through which power is generated as the areas of the electrical double layers achieving a large electrostatic capacitance value change, makes it possible to generate power in a quantity of a completely different order of magnitude compared to that achieved in the vibration-driven energy harvester of the related art, as will be described later.

It is to be noted that the region where the ionic liquid 13 is present and an unoccupied spatial region (a vacuum in the embodiment) take up the gap between the fixed electrode 11 and the movable substrate 12, as indicated in FIG. 2, and an electrostatic capacitance is formed even in the region where the ionic liquid 13 is not present. For instance, the electrostatic capacitance C generated when a pair of electrodes (each having an aerial size of 1 [cm$^2$]) face opposite each other over a distance d=1 [mm] with no ionic liquid 13 present between them, will be calculated as; C=$\varepsilon_0$×1×10$^{-4}$ [m$^2$]/1×10$^{-3}$ [m]≈8.85×10$^{-13}$ [F].

As explained earlier, the values of the electrostatic capacitances generated in the regions where the electrical double layers 16a and 16b, each having an aerial size of 1 [cm$^2$], are present is approximately 10 [μF]=1×10$^{-5}$ [F]. This means that the electrostatic capacitance manifesting in a region where no ionic liquid 13 is present is extremely small, at approximately 1/10$^7$ of the electrostatic capacitances at the electric double layers 16a and 16b.

Accordingly, in the following description of the operation executed at the vibration-driven energy harvester 1 will be given by disregarding the electrostatic capacitance in the region where no ionic liquid 13 is present and assuming that electrical double layer capacitors are connected in series. In other words, power is generated substantially through change caused in the electrostatic capacitances as the areas of the electrical double layers 16a and 16b change at the vibration-driven energy harvester 1.

FIG. 3 schematically illustrates the operation of the vibration-driven energy harvester 1. FIG. 3(a) illustrates a state manifesting as the distance d increases to a maximum value, i.e., d=d0 (as in FIG. 2), whereas FIG. 3(b) illustrates a state manifesting as the distance d is reduced to a smallest value d=d0/2. The volume of the ionic liquid 13 remains unchanged in the states illustrated in FIG. 3(a) and FIG. 3(b), and accordingly, assuming that S0 represents both the contact area of the electret 122 and the ionic liquid 13 and the contact area of the fixed electrode 11 and the ionic liquid 13 in FIG. 3(a), the corresponding contact areas in FIG. 3(b) are each expressed as 2S0. In other words, the area of the electrical double layer 16a is doubled and the electrostatic capacitance thereat increases by a factor of 2 in FIG. 3(b).

As a result, as the movable substrate 12 in the state illustrated in FIG. 3(a) moves toward the fixed electrode, the negative charge moves from the GND side to the fixed electrode 11 and a current I flows to the load 14 along the direction indicated by the arrow in FIG. 3(b). As the movable substrate 12 in the state illustrated in FIG. 3(b) moves upward in the figure, on the other hand, the negative charge moves from the fixed electrode 11 toward the GND side resulting in a current I flowing through load 14 along the direction indicated by the arrow in FIG. 3(a).

Assuming that the area of the electrical double layer 16a in the state shown in FIG. 3(a) is 0.5 [cm$^2$] and the area of the electrical double layer 16a in the state shown in FIG. 3(b) is 1 [cm$^2$], the electrostatic capacitance at the electrical double layer 16a increases from 5 [μF] to 10 [μF]. This means that assuming that the potential difference at the electrical double layer 16a is 1 V, an electrical charge of 5 [μC] passes through the load 14. Further assuming that the shift from the state in FIG. 3(a) to the state in FIG. 3(b) occurs in 0.05 [sec] (equivalent to a vibration at 20 Hz), a 100 [μA] current flows through the load 14. As explained earlier, as the distance d is reduced from d0 to d0/2, the electric current flows from the fixed electrode 11 toward the GND side, whereas as the distance d increases from d0/2 to d0, the electric current flows from the GND side toward the fixed electrode 11. Namely, as the movable substrate 12 vibrates up/down due to a disturbance, an AC current flows through the load 14.

It is to be noted that while an explanation has been given in reference to FIGS. 2 and 3 on an example in which the power generated at the vibration-driven energy harvester 1 is extracted as an electric current, the load may be otherwise connected so as to allow the power to be extracted as a voltage. In such a case, a change in the potential difference is utilized, which is the change in the potential difference between the support substrate 121 and the fixed electrode 11 that occurs as the movable substrate 12 vibrates while the vibration-driven energy harvester 1 is sustained in an open circuit state.

For instance, the distance (hereafter referred to as the electrode distance) between the fixed electrode 11 and the electret 122 may change from d0 to d1 and the contact area of the ionic liquid 13 and the fixed electrode 11, i.e., the areas of the electrical double layers 16a and 16b, may change from S0 to S1. In this situation, Q=CVe and C=ε·S/de are true with Q representing the charge amount at the fixed electrode 11, C representing the electrostatic capacitances at both electrical double layers 16a and 16b, Ve representing the potential difference manifesting at the electrical double layers 16a and 16b, S representing the areas of the electrical double layers 16a and 16b and de representing the thicknesses of the electrical double layers 16a and 16b. While the two equations can be combined and modified into an equation S·Ve=Q·de/ε, a relationship written as S0·Ve0=S1·Ve1 is achieved by the potential difference Ve0 corresponding to the electrode distance d0 and the potential difference Ve1 corresponding to the electrode distance d1 since Q and the thickness de of the electrical double layers remain unchanged. In other words, the potential difference Ve1 manifesting at the electrical double layers 16a and 16b when the electrode distance is d1 changes as expressed; Ve1=(S0/S1)·Ve0.

When the capacitors having 1 [cm$^2$] areas and facing opposite each other over a distance of 1 [mm], as described earlier, configuring a vibration-driven energy harvester in the related art that generates power through a change in the electrostatic capacitance between the electrodes, changes the distance from 1 [mm] to 0.5 [mm], the electrostatic capacitance doubles from 8.85×10$^{-13}$ [F], resulting in a change ΔC in the electrostatic capacitance, which is expressed as; 8.85×10$^{-13}$ [F]. For instance, the change that would occur in the amount of charge at the electrode constituted with an electret with a voltage of 200 V would be calculated as 1.77×10$^{-10}$ [C]=1.77×10$^{-4}$ [μC]. This value amounts to approximately 1/10,000 of 5 [μC] achieved in the embodiment (by assuming that the potential difference manifesting at the electrical double layer 16a is 1 V).

The vibration-driven energy harvester achieved in the embodiment described above is capable of generating power in a quantity incomparably greater than that in the related art by using the electrostatic capacitances at the electrical double layers formed with an ionic liquid. The electrostatic capacitance at an electrical double layer is much greater than the electrostatic capacitance generated at an ordinary capacitor. By taking advantage of these characteristics of electrical double layers, a large quantity of electric power can be obtained through a small displacement in a vibration-driven energy harvester provided as a compact unit. In addition, since the areas of the electrical double layers are altered through a change in the distance between the movable substrate 12 and the fixed electrode 11 resulting from a disturbance, a significant change in the areal size is achieved in correspondence to a small displacement, which makes it possible to further miniaturize the vibration-driven energy harvester 1.

A vibration-driven energy harvester in the related art such as the vibration-driven energy harvester disclosed in PTL1, normally adopts a structure that includes a movable member with a relatively large mass, which is movably supported via an elastic supporting member having an extremely small spring constant. The rationale for this structural design is that the vibration-driven enemy harvester generates power with external vibrations such as walking vibrations, vibrations at a bridge or the like, the frequencies of which fall into a range of several Hz to several tens of Hz. Namely, the structure with the movable member supported by an elastic supporting member having a very small spring constant is adopted so as to allow resonance at such low frequencies. This structural design, adopted in the vibration-driven energy harvester in the related art, gives rise to a problem in that the elastic supporting member tends to break readily. There is also an issue that the vibration-driven energy harvester, which generates power through resonance, can only be used over a narrow band.

In the embodiment achieved by addressing the issues discussed above, a sliding structure such as that shown in FIG. 1 is adopted so as to allow the movable substrate 12 to vibrate freely. As a result, power can be generated with high efficiency regardless of the frequency of the external vibration. However, it will be obvious that the structure, which includes an elastic supporting member used to support the movable substrate 12, may also be adopted in the vibration-driven energy harvester in the embodiment.

In the embodiment, power is generated by altering the contact area with the ionic liquid 13, and for this reason, it is crucial, in order to effectively change the size of the contact area, to assure good water repellency at contact surfaces where contact with the ionic liquid 13 occurs and particularly at the contact surface at which the fixed electrode 11 comes into contact with the ionic liquid 13. While no water repellent treatment (e.g., formation of a water repellent film) is required as long as the fixed electrode is constituted of gold, which assures excellent water repellency, water repellent treatment will be required in conjunction with a fixed electrode constituted of a certain type of electrode material. It is to be borne in mind, at the same time, that the film thickness of such a water repellent film should be minimized, since an increase in the thickness (de in C=εS/de, explained earlier) of the electrical double layer with the water repellent film formed thereupon, is bound to lead to a decrease in the electrostatic capacitance. Such a very thin water repellent film may be, for instance, a monomolecular film with a water repellent property.

It is to be noted that while the container assumes a cylindrical shape and the fixed electrode 11 and the movable substrate 12, both take on a disk shape in the embodiment described above, the present invention may be adopted in conjunction with members having shapes other than these. For instance, the fixed electrode 11 and the movable substrate 12 may be rectangular members. In addition, while the movable substrate 12 moves up/down through a sliding motion, the present invention may instead be adopted in conjunction with a structure in which the electrode side vibrates.

While the load 14 is directly connected to the fixed electrode 11 in FIG. 2 illustrating the operational principle, an electricity generating device may instead be configured by disposing a rectifier circuit, a power storage unit and the like on the output side of the vibration-driven energy harvester 1.

Second Embodiment

Figure 4:
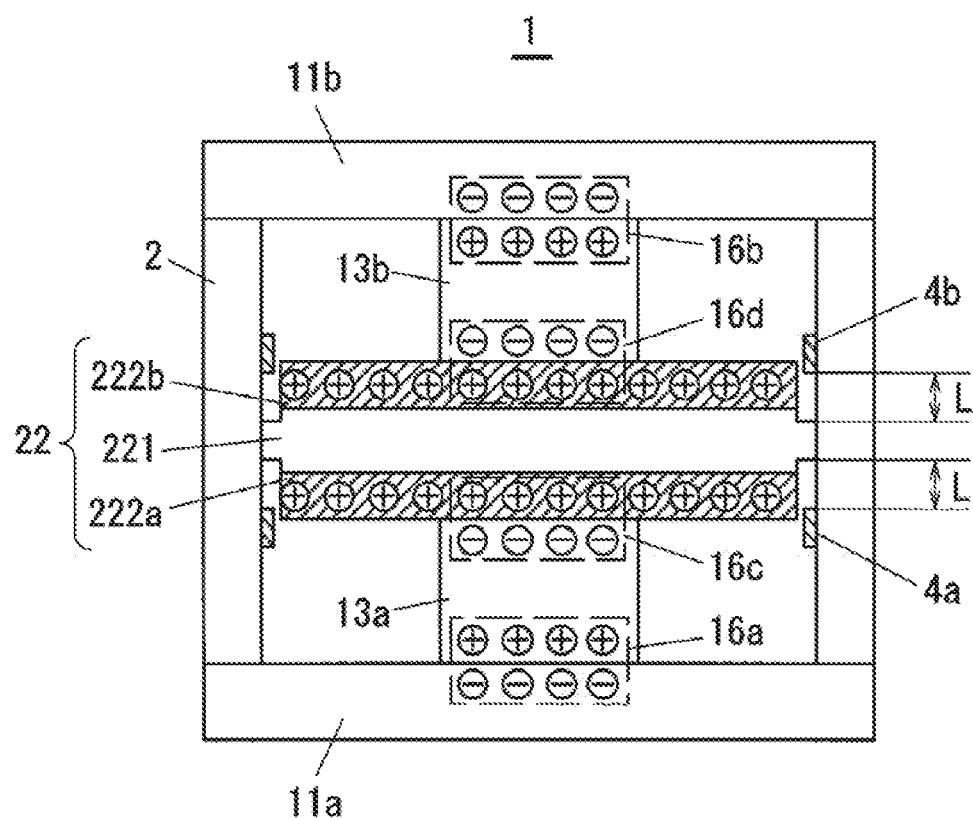
Figure 5:
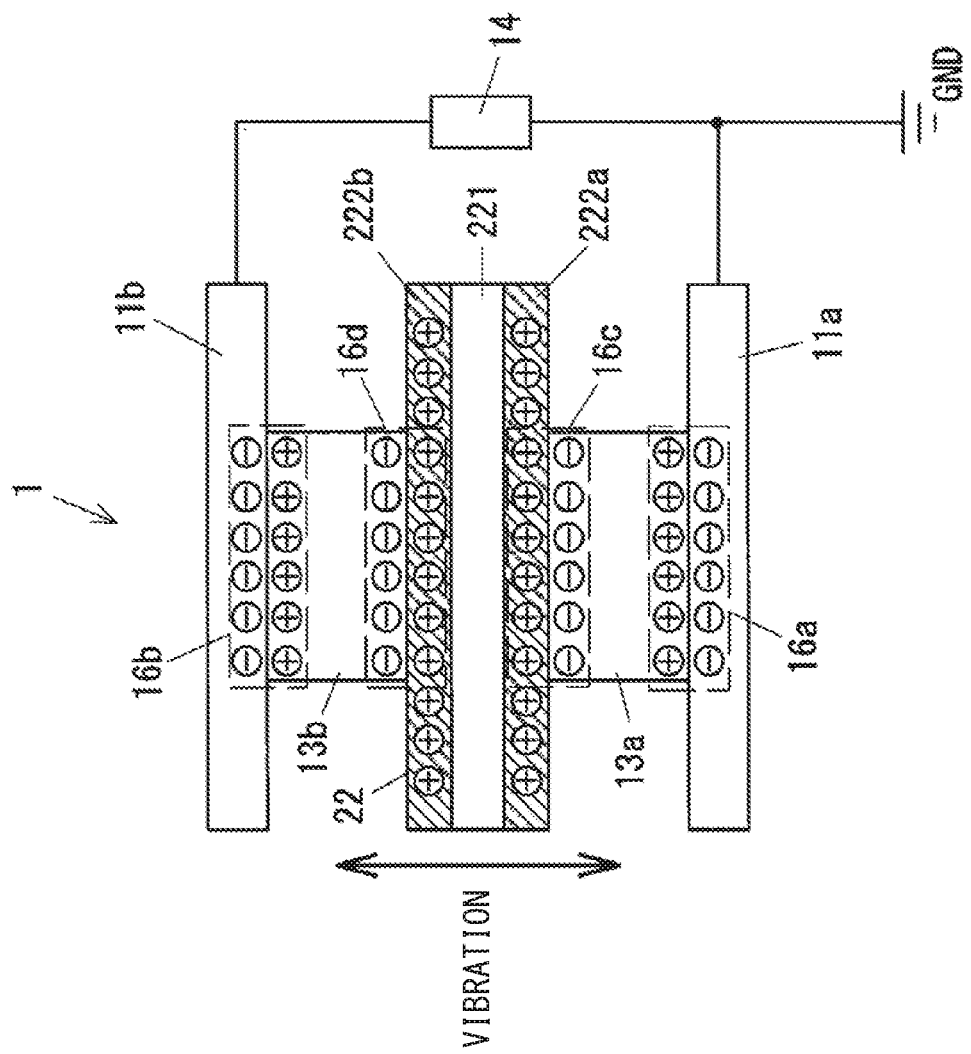
Figure 6:
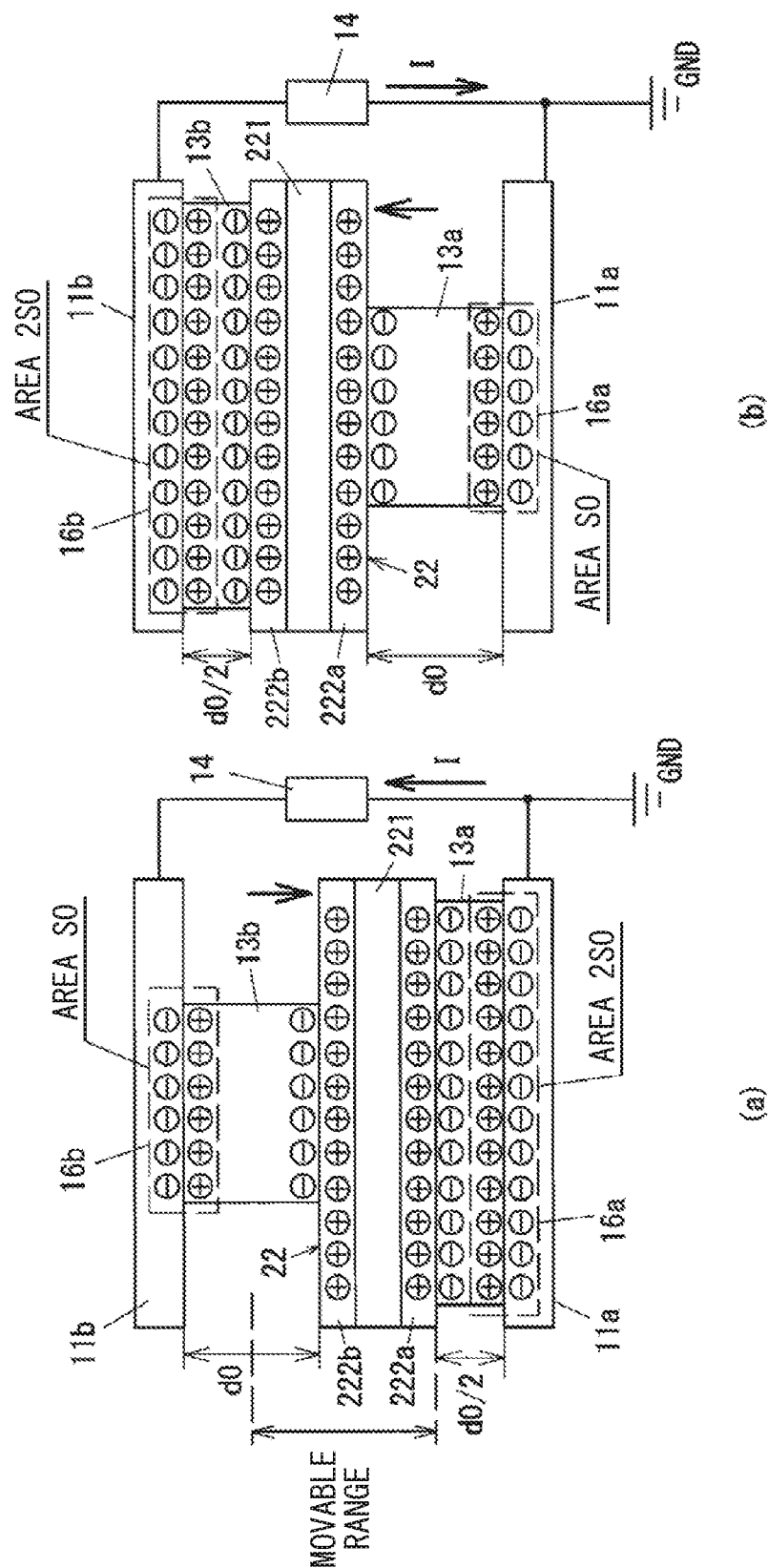
FIG. 6 Illustrations of the power generating operation executed in the second embodiment FIG. 7 Illustrations of a third embodiment FIG. 8 Schematic illustrations of the structure adopted in the vibration-driven energy harvester achieved in a fourth embodiment FIG. 9 Illustrations of the power generating operation executed in the fourth embodiment FIG. 10 An illustration of a structure that allows vibration to occur on the electrode side in the second embodiment FIG. 11 An illustration of a variation of the fourth embodiment FIG. 12 A sectional view of the vibration-driven energy harvester 1 achieved in a fifth embodiment FIG. 13 Illustrations of the front and back surfaces of a movable substrate 42

FIGS. 4 through 6 illustrate the second embodiment of the present invention. FIG. 4 schematically illustrates the structure of a vibration-driven energy harvester 1 in a sectional view similar to that presented in FIG. 1(a). It is to be noted that the following explanation focuses on structural features distinguishing the current embodiment from that shown in FIG. 1.

A movable substrate 22 in this embodiment includes electrets 222a and 222b formed respectively at the front surface and at the back surface of a support substrate 221. A first fixed electrode 11a is disposed so as to face opposite the electret whereas a second fixed electrode 11b is disposed so as to face opposite the electret 222b. An ionic liquid 13a is present in the gap between the electret 222a and the fixed electrode 11a, and an ionic liquid 13b is present in the gap between the electret 222b and the fixed electrode 11b.

The movable substrate 22 adopts a structure that allows it to move up/down between the fixed electrodes 11a and 11b, with its range of movement 2L limited by stoppers 4a and 4b. In the example presented in FIG. 4, the movable substrate 22 is located at the center of the range of movement. A container is configured with a cylindrical portion 2, the fixed electrode 11a mounted at a lower opening of the cylindrical portion 2 and the fixed electrode 11b mounted at an upper opening of the cylindrical portion 2. As in the first embodiment, a vacuum state is sustained inside the container.

FIG. 5 schematically illustrates an essential part of the vibration-driven energy harvester 1. In FIG. 5, showing a load connection structure adopted for current extraction, a load 14 is connected between the fixed electrode 11a and the fixed electrode 11b, with the fixed electrode 11a assuming the GND potential. The electrets 222a and 222b are charged positive. Thus, electrical double layers similar to those in the first embodiment are formed, one at the interface of the ionic liquid 13a and the fixed electrode 11a, one at the interface of the ionic liquid 13a and the electret 222a, one at the interface of the ionic liquid 13b and the fixed electrode 11b and one at the interface of the ionic liquid 13b and the electret 222b. In the figure, reference sign 16a indicates the electrical double layer formed between the ionic liquid 13a and the fixed electrode 11a and the reference sign 16b indicates the electrical double layer formed between the ionic liquid 13b and the fixed electrode 11b. In addition, reference signs 16c and 16d respectively indicate the electrical double layer formed at the interface of the ionic liquid 13a and the electret 222a and the electrical double layer formed at the interface of the ionic liquid 13b and the electret 222b.

FIG. 6 illustrates the electric current flowing through the load 14 as the movable substrate 22 vibrates. FIG. 6(a) shows the movable substrate 22 having moved to the lower end of the movable range. The various members are set so that the distance between the electret 222a and the fixed electrode 11a is d0/2 and the distance between the movable electrode 11b and the electret 222b is d0 in this state. FIG. 6(b) shows the movable substrate 22 having moved to the upper end of the movable range. In this state, the distance between the electret 222a and the fixed electrode 11a is d0 and the distance between the movable electrode 11b and the electret 222b is d0/2.

The volumes of the ionic liquids 13a and 13b are equal (=d0×S0), and in the state illustrated in FIG. 6(a), the contact area of the ionic liquid 13b and the fixed electrode 11b and the contact area of the ionic liquid 13b and the electret 222b are both S0, whereas the contact area of the ionic liquid 13a and the fixed electrode 11a and the contact area of the ionic liquid 13a and the electret 222a are both 2S0. Accordingly, relative to an electrostatic capacitance C0 at the electrical double layer 16b, the electrostatic capacitance at the electrical double layer 16a is doubled to 2C0. In the state illustrated in FIG. 6(b), on the other hand, the contact area of the ionic liquid 13b and the fixed electrode 11b and the contact area of the ionic liquid 13b and the electret 222b are both 2S0 and the contact area of the ionic liquid 13a and the fixed electrode 11a and the contact area of the ionic liquid 13a and the electret 222a are both S0.

Since the electrostatic capacitance at an electrical double layer is in proportion to the corresponding contact area, the electrostatic capacitance at the electrical double layer 16a changes from 2C0 to C0 and the electrostatic capacitance at the electrical double layer 16b changes from C0 to 2C0 as the movable substrate 22 initially assuming the state shown in FIG. 6(a) moves toward the fixed electrode 11b to enter the state shown in FIG. 6(b). As a result, the negative charge moves from the fixed electrode 11a to the fixed electrode 11b, and consequently, a current I flows through the load 14, as indicated by the arrow in FIG. 6(b).

If, on the other hand, the movable substrate 22 in the state shown in FIG. 6(b) moves toward the fixed electrode 11a to enter the state shown in FIG. 6(a), the electrostatic capacitance at the electrical double layer 16a changes from C0 to 2C0 and the electrostatic capacitance at the electrical double layer 16b changes from 2C0 to C0. As a result, the negative charge moves from the fixed electrode 11b to the fixed electrode 11a, and consequently, a current I flows through the load 14, as indicated by the arrow in FIG. 6(a).

In an open circuit state, a relationship similar to that between the movable substrate 12 and the fixed electrode 11 described in reference to FIG. 2 will be achieved with regard to the potential difference between the movable substrate 22 and the fixed electrode 11a and the potential difference between the movable substrate 22 and the fixed electrode 11b. However, since the phases of the individual potentials are offset by 180° relative to each other, the potential difference manifesting between the fixed electrode 11a and the fixed electrode 11b is twice that manifesting in the structure shown in FIG. 3.

Thus, power (electric power) twice the power generated in the first embodiment shown in FIG. 1 is obtained through the power generation achieved through the present embodiment.

It is to be noted that while the power generated in the embodiment is also output as an electric current, it may instead be extracted as a voltage. Since the operation executed in such a case will be similar to that described in reference to the first embodiment, a repeated explanation is not provided. In addition, while the container assumes a cylindrical shape and the fixed electrodes 11a and 11b and the movable substrate 22 take on a disk shape in the embodiment described above, the present invention may be adopted in conjunction with members having shapes other than these. Furthermore, while the movable substrate 22 moves up/down through a sliding motion, the present invention may instead be adopted in conjunction with a structure in which the movable substrate 22 is supported via, for instance, an elastic member.

Figure 10:
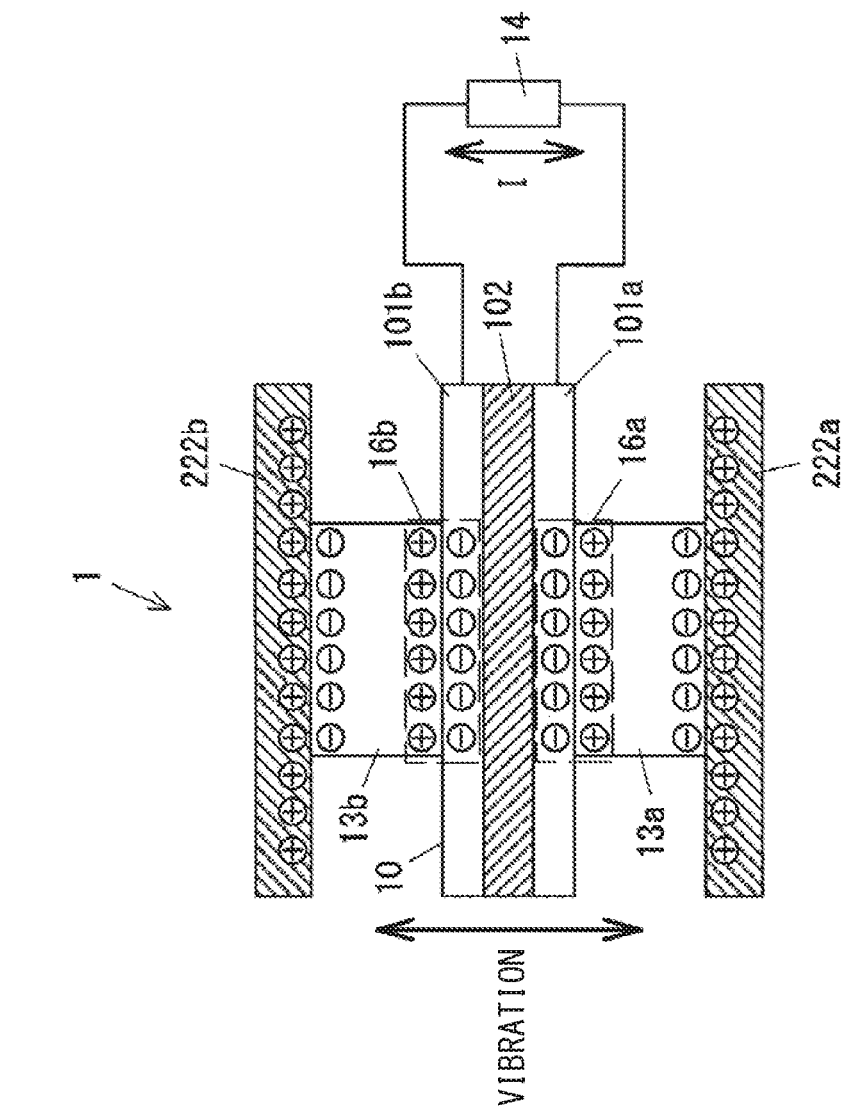

In addition, the present invention may be adopted in a structure such as that shown in FIG. 10, in which the electrode side, instead of the electret side, vibrates. In the example presented in FIG. 10, a movable electrode 10 is disposed so as to be allowed to move up/down between a pair of electrets 222a and 222b that function as fixed electrodes. The electrets 222a and 222b are formed so that their surfaces that face opposite the movable electrode 10 are charged. The movable electrode 10 assumes a structure that includes an insulating substrate 102 held between electrodes 101a and 101b constituted of gold or the like. The electrode 101a faces opposite the electret 222a, whereas the electrode 101b faces opposite the electret 222b.

The load 14 is connected between the electrode 101a and the electrode 101b. As the movable electrode 10 moves toward, for instance, the electret 222a, the contact area of the electrode 101a and the ionic liquid 13a increases and the contact area of the electrode 101b and the ionic liquid 13b decreases. As a result, the negative charge moves via the load 14 from the electrode 101b to the electrode 101a and consequently, an electric current I flows through the load 14 along the upward direction in the figure. If, on the other hand, the movable electrode 10 moves toward the electret 222b, the negative charge moves from the electrode 101a to the electrode 101b, resulting in an electric current flowing through the load 14 along the downward direction in the figure.

Third Embodiment

Figure 7:
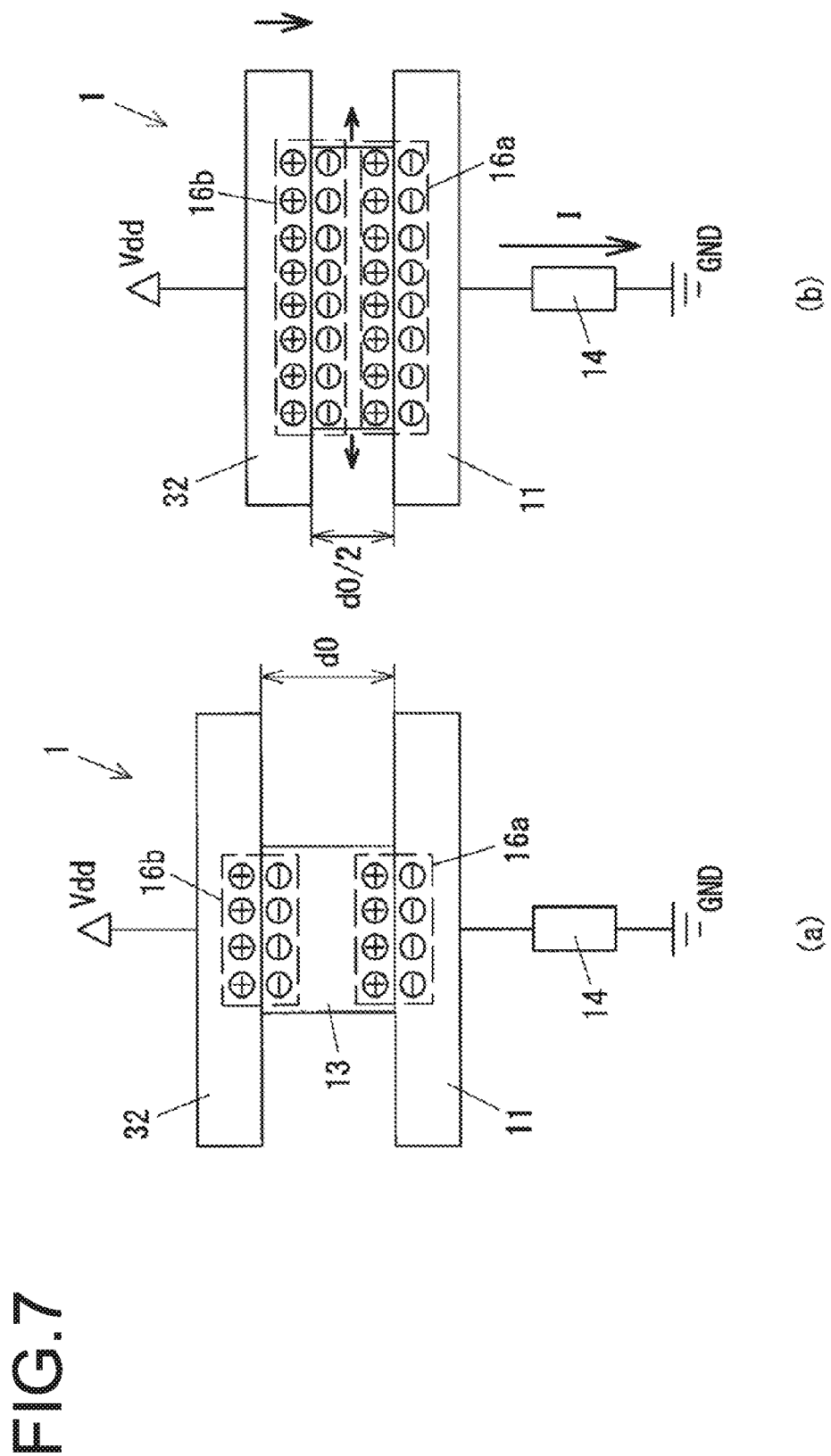

FIG. 7 schematically illustrates an essential part of the vibration-driven energy harvester 1 achieved in the third embodiment of the present invention. In the first embodiment described earlier, the electrical double layer 16a is formed at the contact region where the ionic liquid 13 and the fixed electrode 11 are in contact with each other by using the electret 122, as shown in FIG. 2. In this embodiment, a movable electrode 32 with a bias voltage Vdd applied thereto from an external source is used in place of the movable substrate 12 with the electret 122 formed thereat.

As the bias voltage Vdd is applied to the movable electrode 32, negative ions in the ionic liquid 13 are attracted toward the movable electrode and positive ions in the ionic liquid 13 are attracted toward the fixed electrode, as illustrated in FIG. 7(a). As a result, electrical double layers 16a and 16b are formed at the interface of the fixed electrode 11 and the ionic liquid 13 and at the interface of the movable electrode 32 and the ionic liquid 13. Assuming that the bias voltage Vdd is equal to the voltage (surface potential) at the electret 122 in the first embodiment, the electrical double layers 16a and 16b thus formed will be similar to those in FIG. 2. As the distance between the fixed electrode 11 and the movable electrode 32 is reduced to d0/2 as shown in FIG. 7(b), the areas of the electrical double layers 16a and 16b become twice as large, thereby doubling the electrostatic capacitances thereat, as has been explained in reference to the first embodiment.

In addition, instead of moving an electrode connected to a power source up/down, an electrode connected to a load may be caused to move up/down. It is known that the formation of an electrical double layer at the interface of a metal electrode and an ionic liquid is attributed to an electro-kinetic phenomenon. For instance, a kinetic potential of approximately several tens of [mV] is generated at the interface of a metal electrode constituted of, for example, gold and an ionic liquid. Thus, as described above, an electrical double layer corresponding to the voltage is formed at the interface of the metal electrode and the ionic liquid, albeit the voltage is bound to be lower than that achieved in conjunction with an electret or an external power source. Consequently, a vibration-driven energy harvester similar to that described in reference to the embodiment can be configured by using a kinetic potential.

Fourth Embodiment

FIGS. 8 and 9 illustrate the fourth embodiment of the present invention. In the first through third embodiments described above, the distance between a pair of substrates with the ionic liquid 13 held between them is altered so as to generate power by altering the contact areas where the substrates contact the ionic liquid (i.e., the areas of the respective electrical double layers). The present embodiment is distinct in that the areas of the electrical double layers are altered by sliding a movable substrate with an electret formed thereat parallel to the contact surface where it is in contact with the ionic liquid.

FIG. 8 schematically illustrates the structure of a vibration-driven energy harvester 1. FIG. 8(a) is a sectional view of the vibration-driven energy harvester 1, whereas FIG. 8(b) is a sectional view taken along B-B. The vibration-driven energy harvester 1 includes a pair of fixed electrodes 11a and 11b and a movable substrate 42 disposed between the fixed electrodes. The fixed electrode 11a is fixed to a frame member 43a so that it fits into an opening 430 in the frame member 43a. The fixed electrode 11b is fixed to a frame member 43b so that it fits into an opening 431 in the frame member 43b. The opening 430 and the opening 431 face opposite each other.

Balls 432 are disposed at the surfaces of the frame members 43a and 43b each facing opposite the movable substrate 42. As FIG. 8(b) illustrates, a plurality of balls 432 are disposed on the circumference of a circle centered on the axis of each opening 430 or 431. The movable substrate 42 is disposed so that it is held between the balls 432 disposed at the frame member 43a and the balls 432 disposed at the frame member 43b. The frame members 43a and 43b are formed from an insulating material. It is also desirable that the balls 432 be formed with an insulating material (e.g., ceramic balls).

An ionic liquid 13a fills the opening 430 in which the fixed electrode 11a is fitted so that the ionic liquid 13a is present between the fixed electrode 11a and the movable substrate 42. Likewise, an ionic liquid 13b fills the opening 431 in which the fixed electrode 11b is fitted so that the ionic liquid 13b is present between the fixed electrode 11b and the movable substrate 42.

The movable substrate 42, assuming a disk shape, includes dielectric members 422a and 422b respectively disposed at the front surface and at the back surface of a support substrate 421. A circular region R at the center of each of the dielectric members 422a and 422b are charged, thereby forming an electret over the circular region R. Namely, the dielectric members 422a and 422b each function as an electret over the circular region R. In the following description, the circular region R will be referred to as an electret R. The electrets (circular regions) R in the embodiment are set so that their shapes substantially match the sectional shapes of the openings 430 and 431.

The movable substrate 42, the frame member 43a at which the fixed electrode 11a is mounted and the frame member 43b at which the fixed electrode 11b is mounted are housed inside a container configured with a cylindrical portion 440, a top plate 441 disposed at an upper opening of the cylindrical portion 440 and a bottom plate 442 disposed at a lower opening of the cylindrical portion 440. The lower end surface of the fixed electrode 11a is exposed to the outside through an opening formed over a central region of the bottom plate 442. The upper end surface of the fixed electrode 11b is exposed to the outside through an opening formed over a central region of the top plate 441. The frame member 43a is fixed to the cylindrical portion 440 or the bottom plate 442. The frame member 43b is fixed to the cylindrical portion 440 or the top plate 441. Thus, as the container is subjected to a vibration originating from an external source, the movable substrate 42 slides to the left/right relative to the frame members 43a and 43b. It is desirable that a state of vacuum be sustained inside the container to ensure that the vibration of the movable substrate 42 is not hindered.

FIG. 9 illustrates the power generating operation executed in the fourth embodiment. As explained earlier, the movable substrate 42 includes the dielectric members 422a and 422b respectively formed at the front surface and at the back surface of the support substrate 421. The central regions of the dielectric members 422a and 422b are charged positive and thus form electrets R.

When the movable substrate 42 is positioned at the center, as shown in FIG. 9(a), the electrets R face opposite the ionic liquid 13a and 13b. In this situation, electrical double layers 16a and 16b are formed respectively on the two sides of the interface of one of the electrets R and the ionic liquid 13a and on the two sides of the interface of the other electret R and the ionic liquid 13b. In addition, an electrical double layer 16c is formed on the two sides of the interface of the fixed electrode 11a and the ionic liquid 13a and an electrical double layer 16d is formed on the two sides of the interface of the fixed electrode 11b and the ionic liquid 13b. As the movable substrate 42 in this state slides to the left, the electrets R, too, move to the left, resulting in a decrease in the areas of the electret R in contact with the ionic liquids 13a and 13b, as illustrated in FIG. 9(b). The areas of the electrical double layers 16a through 16d thus decrease, leading to a decrease in the electrostatic capacitances at the electrical double layers 16a through 16d. Consequently, negative charges in the fixed electrodes 11a and 11b move toward the GND side, causing an electric current I to flow through the load 14, as indicated by the arrow. If, on the other hand, the movable substrate 42 in the state shown in FIG. 9(b) slides to enter the state shown in FIG. 9(a), an electric current will flow through the load 14 along the direction opposite from that indicated by the arrow in FIG. 9(b).

While the fixed electrodes 11a and 11b are disposed one at the top side and the other at the bottom side of the sliding movable substrate 42 in the fourth embodiment described above, a single fixed electrode may be disposed at either side of the movable substrate 42 instead. It is to be noted that by adopting a structure that includes the fixed electrodes 11a and 11b disposed at the top side and at the bottom side of the movable substrate 42, an electric current double that achieved in the structure with a fixed electrode disposed only at one side can be generated.

Figure 11:
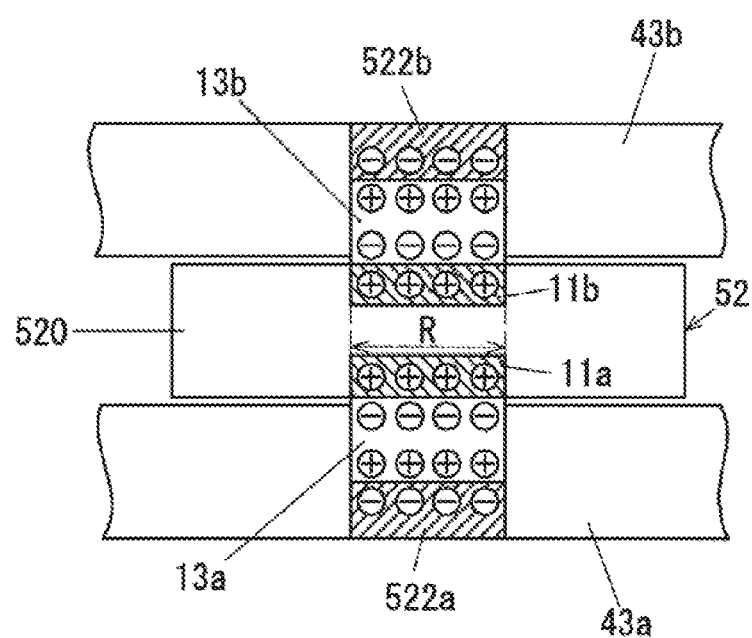

In addition, electrets 522a and 522b may be disposed at positions corresponding to the fixed electrode 11a and the fixed electrode 11b respectively, which owe disposed over circular regions R (formed as recessed portions) of a movable substrate 52, as shown in FIG. 11, or electrodes with a bias voltage applied thereto may be disposed in place of the electrets 522a and 522b. FIG. 11, the electrodes 11a and 11b are disposed at the front surface and at the back surface of a support substrate 520 constituted of an insulating material.

Furthermore, the fixed electrodes 11a and 11b and the electrets R do not need to take a circular shape, and the present invention may instead be adopted in a structure in which a rectangular electret slides perpendicular to the sides of a rectangular fixed electrode.

Fifth Embodiment

Figure 12:
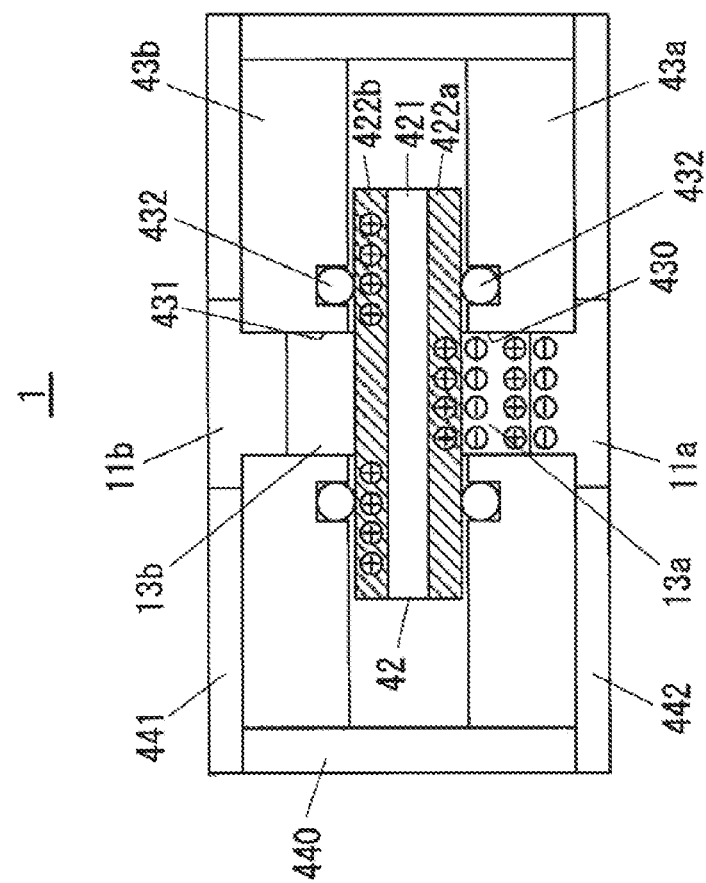
Figure 14:
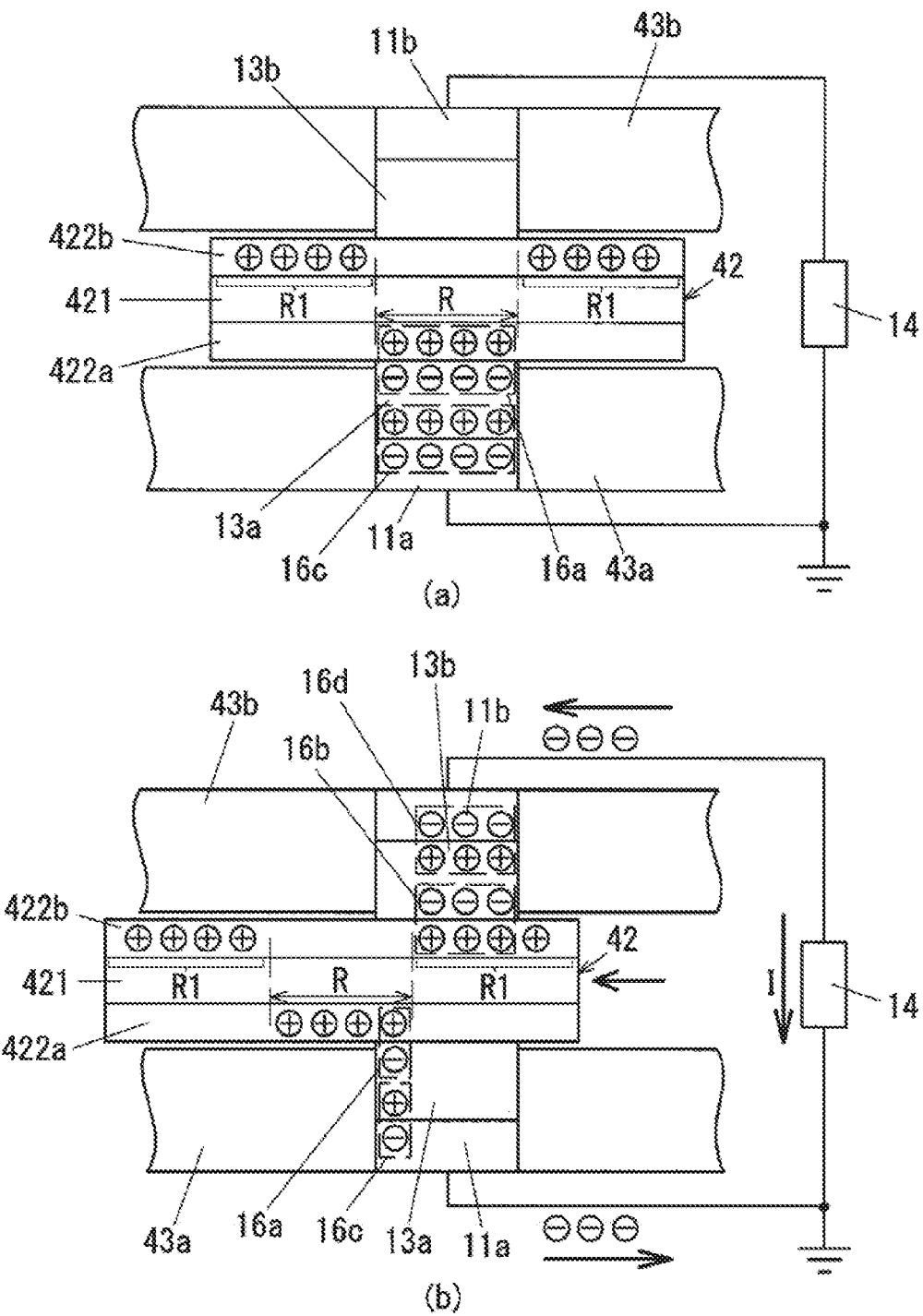
FIG. 14 Illustrations of the power generating operation executed in the fifth embodiment

FIGS. 12 through 14 illustrate the fifth embodiment of the present invention. FIG. 12 shows a vibration-driven energy harvester 1 in a sectional view, and FIG. 13 shows the front surface and the back surface of a movable substrate 42. In the fifth embodiment, electrets are formed at the dielectric members 422a and 422b disposed at the front surface and at the back surface of the movable substrate 42 over regions different from those where the electrets are formed in the fourth embodiment. Since other structural features of the fifth embodiment are similar to those in the fourth embodiment, a repeated explanation is not provided.

In the fourth embodiment explained earlier, electrets are formed over the central regions R at the dielectric members 422a and 422b, as shown in FIG. 8. The fifth embodiment is distinguishable in that while an electret is formed over a central region R (a region with a radius r) at the dielectric member 422a, an electret is formed over a region R1 (a region beyond the radius r and within a radius 2r) outside the central region R at the dielectric member 422b, as illustrated in FIGS. 12 and 13.

FIG. 14 illustrates the power generating operation. When the movable substrate 42 is at the central position, central regions R of the movable substrate 42 face opposite the fixed electrodes 11a and 11b (i.e., the ionic liquids 13a and 13b), as shown in FIG. 14(a). In this state, an electrical double layer 16a is formed over the contact region where the region of the dielectric member 422a over which the electret is formed and the ionic liquid 13a are in contact with each other and an electrical double layer 16c is formed over the contact region where the fixed electrode 11a and the ionic liquid 13a are in contact with each other. The areas of the electrical double layers 16a and 16c thus formed match the areas of the regions R.

As the movable substrate 42 moves to the left, as shown in FIG. 14(b), the area over which the region R, where the electret is formed at the dielectric member 422a, faces opposite the fixed electrode 11a becomes smaller. As a result, the areas of the electrical double layers 16a and 16c, too, decrease. At the dielectric member 422b, on the other hand, part of the region R1 where the electret is formed faces opposite the fixed electrode 11b. As a result, an electrical double layer 16b is formed over the contact region where the region R1 of the dielectric member 422b over which the electret is formed and the ionic liquid 13b are in contact with each other and an electrical double layer 16d is formed over the contact region where the fixed electrode 11b and the ionic liquid 13b are in contact with each other in correspondence. Namely, the areas of the electrical double layers increase on the side where the ionic liquid 13b is present. As a result, an electric current flows through the load 14, as indicated by the arrow.

As the movable substrate 42 in the state illustrated in FIG. 14(b) moves to the right in the figure, the areas of the electrical double layers 16a and 16c increase and the area of the electrical double layers 16b and 16d decrease. As a result, the direction of the electric current flowing through the load 14 is the reverse of that shown in FIG. 14(b). Subsequently, as the movable substrate 42 moves until it assumes the state shown in FIG. 14(a) and then further moves to the right, a state that is the lateral reverse of that shown in FIG. 14(b) is achieved. In this situation, the direction of the electric current flowing through the load 14 is the same as that in FIG. 14(b). Namely, as the movable substrate 42 in the state shown in FIG. 14(a) vibrates to the left/right, an AC current flows through the load 14.

The vibration-driven energy harvester according to the present invention described above includes a fixed electrode 11, a movable substrate 12 disposed so as to face opposite the fixed electrode 11 and is allowed to move along a direction in which the distance to the fixed electrode 11 changes (along the up/down direction in the figures), and an ionic liquid 13 disposed between the fixed electrode 11 and the movable substrate 12 facing opposite each other, as illustrated in FIGS. 1 and 2.

As the movable substrate 12 is caused to move by a disturbance, the area of the electrical double layer 16a formed on the two sides of the interface of the fixed electrode 11 and the ionic liquid 13 and the area of the electrical double layer 16b formed on the two sides of the interface of the electret 122 at the movable substrate 12 and the ionic liquid 13 change as shown in FIG. 3. As a result, a change occurs in the electrostatic capacitance at the electrical double layer 16a so that an electric current flows through the load 14 connected to the fixed electrode 11.

The thicknesses of the electrical double layers, set in an nm order, are significantly smaller in comparison to the distance between electrodes in a vibration-driven energy harvester in the related art, and thus, the extent of Change occurring in the electrostatic capacitance as the movable substrate 12 vibrates, also increases significantly. Consequently, advantages are achieved in that power can be generated in a much greater quantity compared to that achieved in the vibration-driven energy harvester in the related art and that miniaturization of the vibration-driven energy harvester is facilitated. In addition, since the areas of the electrical double layers are altered by changing the distance between the fixed electrode 11 and the electret 122, a significant change in the areal size can be achieved by displacing the movable substrate 12 only slightly.

It is to be noted that since the surface potential at the electret 122 is set to fall within the potential window of the ionic liquid 13, the electrical double layers 16a and 16b can be formed with stability without any electric current flowing through the ionic liquid 13.

It is to be also noted that the electrical double layers 16a and 16b may be formed by using the electret 122 as described above, through the electro-kinetic phenomenon or by applying a bias voltage to a movable electrode via a voltage source, as shown in FIG. 7. The bias voltage should be set within the potential window mentioned earlier.

As an alternative, a structure that includes the movable substrate 22 with the electret 222b used as a front-side electrode and the electret 222a used as a back-side electrode respectively formed at the front surface and at the back surface thereof, the fixed electrode 11b disposed so as to face opposite the electret 222b and the fixed electrode 11a disposed so as to face opposite the electret 222a, as shown in FIG. 4, may be adopted. In this alternative structure, the ionic liquid 13b is disposed between the fixed electrode 11b and the electret 222b and the ionic liquid 13a is disposed between the electrode 11a and the electret 222a. Consequently, a change in the voltage occurs between the fixed electrode 11a and the fixed electrode 11b to an extent that is twice the extent of the change achieved in conjunction with a single fixed electrode 11, in the structure shown in FIG. 2.

As a further alternative, the ionic liquids 13a and 13b may be disposed between the fixed electrode 11a and the movable substrate 42 and between the fixed electrode 11b and the movable substrate 42 and the movable substrate 42 may be caused to slide relative to the fixed electrodes 11a and 11b, as illustrated in FIGS. 8 and 9. As the movable substrate 42 slides, the contact areas over which the regions R where electrets are formed at the dielectric members 422a and 422b disposed at the front surface and the back surface of the movable substrate 42 are in contact with the ionic liquids 13a and 13b change and thus, the areas of electrical double layers 16c, 16d each formed on the two sides of the interface of the fixed electrode 11a or 11b and the corresponding ionic liquid 13a or 13b, change.

The embodiments described above may be adopted in any conceivable combination. In addition, as long as features characterizing the present invention remain intact, the present invention is in no way limited to the particulars of the specific embodiments. It is to be noted that while the present invention is embodied as a vibration-driven energy harvester, as has been described above, capacitors achieving a large capacity through the formation of electrical double layers in conjunction with an ionic liquid, as disclosed in the embodiments, may be used in applications of large-capacity power storage elements. Such a power storage element may be used in order to store a charge generated through an external vibration until it becomes necessary to use electrical power. Since a power storage element can be configured by using a material similar to that used to configure a generator element and adopting a similar structure, a device capable of functioning both as a power generator and a storage element can be manufactured with ease.

The disclosure of the following priority application is herein incorporated by reference:
Japanese Patent Application No. 2014-36507 filed Feb. 27, 2014

REFERENCE SIGNS LIST

1 . . . vibration-driven energy harvester, 4a, 4b . . . stopper, 10, 32 . . . movable electrode, 11, 11a, 11b . . . fixed electrode, 12, 22, 42, 52 . . . movable substrate, 13, 13a, 13b . . . ionic liquid, 14 . . . load, 16a to 16d . . . electrical double layer, 121, 221 . . . support substrate, 122, 222a, 222b, 522a, 522b . . . electret

The invention claimed is:
1. A vibration-driven energy harvester, comprising:
a fixed electrode;
a movable electrode that is disposed so as to face opposite the fixed electrode and is allowed to move relative to the fixed electrode; and
an ionic liquid disposed between the fixed electrode and the movable electrode which face opposite each other, wherein:
the moveable electrode and the fixed electrode are arranged such that power is generated when an external vibration moves the movable electrode toward and away from the opposite-facing fixed electrode such that a distance between the movable electrode and the fixed electrode changes, the change in the distance causing a change in an area of an electrical double layer formed on two sides of an interface of the fixed electrode and the ionic liquid and an area of an electrical double layer formed on two sides of an interface of the movable electrode and the ionic liquid,
one of the fixed electrode and the movable electrode facing opposite each other is an electret electrode, and
a surface potential at the electret electrode is set within a potential window of the ionic liquid.
2. The vibration-driven energy harvester according to claim 1, wherein:
the electrical double layers are formed through an electro-kinetic phenomenon occurring over a contact region where the fixed electrode and the ionic liquid are in contact with each other and over a contact region where the movable electrode and the ionic liquid are in contact with each other.

3. The vibration-driven energy harvester according to claim 2, wherein:
   the movable electrode includes a front-side electrode disposed on a front surface side of the movable electrode and a back-side electrode disposed on a back surface side of the movable electrode;
   the fixed electrode includes a first electrode disposed so as to face opposite the front-side electrode and a second electrode disposed so as to face opposite the back-side electrode; and
   the ionic liquid is disposed between the first electrode and the front-side electrode and between the second electrode and the back-side electrode.

4. The vibration-driven energy harvester according to claim 1, wherein:
   the movable electrode includes a front-side electrode disposed on a front surface side of the movable electrode and a back-side electrode disposed on a back surface side of the movable electrode;
   the fixed electrode includes a first electrode disposed so as to face opposite the front-side electrode and a second electrode disposed so as to face opposite the back-side electrode; and
   the ionic liquid is disposed between the first electrode and the front-side electrode and between the second electrode and the back-side electrode.

* * * * *